No. 12,119. REISSUED JUNE 9, 1903.

E. OEHRLE.

COMBINATION SQUARE AND PROTRACTOR.

APPLICATION FILED DEC. 22, 1902.

WITNESSES:

M. Krechy.

INVENTOR:

Emanuel Oehrle

BY Geo. W. Sues.

Attorney.

No. 12,119. Reissued June 9, 1903.

UNITED STATES PATENT OFFICE.

EMANUEL OEHRLE, OF OMAHA, NEBRASKA.

COMBINATION SQUARE AND PROTRACTOR.

SPECIFICATION forming part of Reissued Letters Patent No. 12,119, dated June 9, 1903.

Original No. 706,095, dated August 5, 1902. Application for reissue filed December 22, 1902. Serial No. 136,304.

*To all whom it may concern:*

Be it known that I, EMANUEL OEHRLE, of Omaha, in the county of Douglas and State of Nebraska, have invented certain new and useful Improvements in Combination Squares and Protractors; and I do hereby declare the following to be a full, clear, and exact description of the invention, that will enable others skilled in the art to which it appertains to make and use the same, reference being had to the accompanying drawings, and to the figures of reference marked thereon, which form a part of this specification.

The present invention relates to improvements in combination squares and protractors; and it consists in a square having a body portion or head, a straight-edge, and means for pivotally securing the straight-edge in the said head, whereby the straight-edge may be set and held at various angles with respect to the different edges of the head.

It further consists in certain novel constructions, combinations, and arrangement of parts, as will be hereinafter fully described and claimed.

Figure 2:
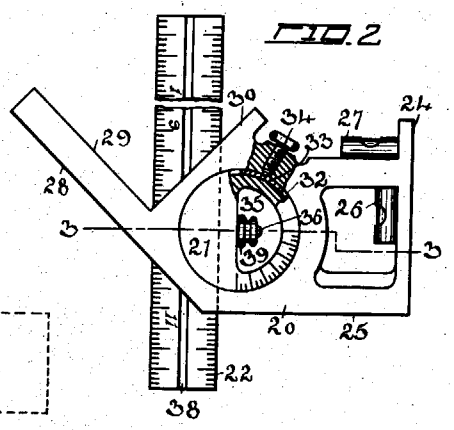
Figure 3:
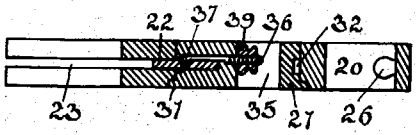
Figure 1:
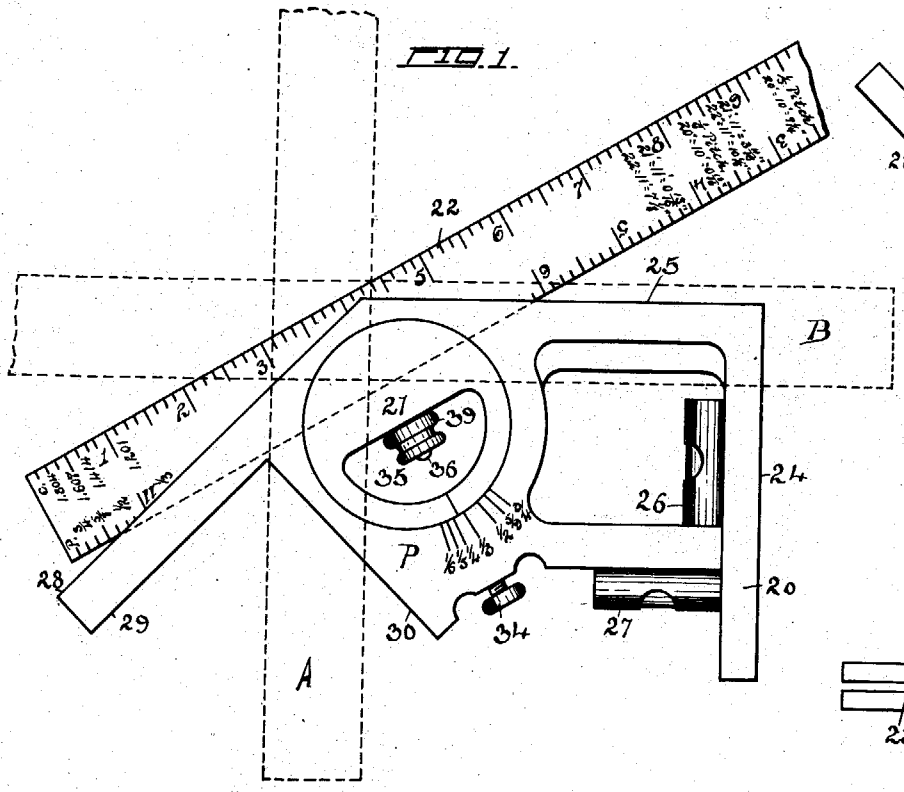

In the accompanying drawings, Figure 1 is an elevation of one side of the combination-square, the blade or straight-edge being shown as set at an angle, while the extreme adjustments of the said straight-edge are indicated in dotted lines. Fig. 2 is an elevation of the opposite side of the square. Fig. 3 is a transverse cross-section taken upon the line 3 3 of Fig. 2.

It is the purpose of the present invention to provide a convenient and comparatively inexpensive combination-square suitable for machinists, pattern-makers, carpenters, and the like, the one instrument being capable of serving as a level, miter, bevel, center-square, and protractor and in addition to these being capable of certain special uses, as will be hereinafter fully described.

The instrument is made up principally of three parts—namely, a main body portion or head 20, a rotatable graduated disk 21, and a straight-edge or scale 22—to which are added certain other parts, as will be hereinafter set forth. The head 20 is preferably made substantially as illustrated in the drawings, being formed with straight edges or bearing-surfaces 24 and 25, arranged at right angles to each other. Small spirit-levels 26 and 27 are mounted upon the head 20, arranged parallel, respectively, with the surfaces 24 and 25, so that any thing or object to which these surfaces are applied may be properly leveled. These levels 26 and 27 are preferably made no wider than the thickness of the material composing the head 20 and are arranged upon the edges of inner cut-out or open portions of the head, so as to be entirely out of the way and well protected against accidental injury. The head is formed also with a projecting arm formed with a surface 28, which is arranged at an angle of forty-five degrees to the surface 25. A surface 29 is also formed on this arm parallel with the surface 28. Another surface 30 is also formed upon the head 20, which extends at right angles to the surface 29, forming therewith an interior right angle. This interior angle is so arranged that when the straight-edge 22 is brought to the position indicated at A in Fig. 1 it forms with the said surfaces a center-square of the ordinary type. It may be noted at this point that when the straight-edge 22 is set at any other position than that shown at A it may be used for determining lines on a circular surface other than those which are radially arranged—as, for example, where laying off a ratchet or other toothed wheel.

The blade 22 is adjustably secured to the disk 21, so as to be carried thereby and held in various positions. The head 20 is kerfed or slotted centrally through the edges which carry the surfaces 25 28 29 and a part of 24 and 30. The position of the kerf 23 with respect to the cross-section of the head 20 will be apparent from Fig. 3, while the extent of the kerf is indicated by the extreme dotted positions of the straight-edge, as shown in Fig. 1. Since the blade is thus arranged centrally in the various surfaces of the head, the square may be reversed and either side be applied to work in hand with equal facility. Thus corresponding angles may be obtained with the instrument without changing the position of the straight-edge 22.

The disk 21 is preferably formed of a thickness equal to that of the head 20 and engages a circular opening in the same. The disk 21 is formed upon one side with a lip or shoulder 31, which fits a corresponding countersunk annular recess in the body of the head 20, as will appear upon examining Fig. 3. On the periphery of the disk 21 is formed an annular groove 32, which is adapted to receive a curved sliding brake piece or shoe 33. A set-screw 34 extends through a portion of the head 20, engaging screw-threads therein, its inner end or point engaging a recess or socket formed in the shoe 33. This screw thus engaging the shoe prevents the same from moving from its position when the disk 21 is turned in its bearing. The screw, with the shoe, also serves the purpose of locking the disk in place, so as not to move laterally from its bearing, and also serves the purpose when the screw is tightened of preventing the disk from turning in its socket when the straight-edge carried thereby has been properly set. The disk 21 is also kerfed, its kerf coinciding with that in the head 20. The dotted line in Fig. 2 indicating the inner edge of the blade or straight-edge 22 shows the depth which the kerf reaches in the disk 21. The straight-edge 22 is secured to the disk 21 by means of a pin 36, which is formed at its outer end with a head turned at right angles to the pin and formed so as to engage and project into a groove or slot 38, formed in one face of the blade or straight-edge 22. The inner end of the pin 36 is screw-threaded, so as to receive a milled nut, by which the pin can be drawn inwardly for clamping the straight-edge tightly against the disk 21. The disk is provided with a central segmental opening to accommodate the nut 39 upon the end of the pin 36 and permit the same to be easily reached and operated by the fingers of any person using the instrument. By loosening the nut 39, so as to relieve the pressure of the screw 36 upon the straight-edge, the said straight-edge can be moved longitudinally with respect to the disk 21, so as to assume any new position desired and so that the straight-edge may be made to project suitable distances upon either side of the head 20. When the desired adjustment has been attained, the milled nut 39 is tightened for clamping the straight-edge to the disk. After this the straight-edge is ready to be adjusted to any suitable angle by loosening the pin 34 and turning the disk 21 till the desired angle is attained, after which the set-screw 34 is tightened again.

As shown in Fig. 2 of the drawings, one side of the disk 21 is preferably provided with graduations covering a quarter of its circumference, dividing the same into degrees, such as appear ordinarily upon protractors for indicating the angle to which the blade is to be turned between the extreme positions indicated at A and B in Fig. 1. On the opposite side of the disk, as shown in Fig. 1, a single line or indication is placed in position to be brought into correspondence with the marks of a scale P on the head 20. This scale is an especial adaptation of this instrument to enable carpenters or others to determine the correct angles for cutting the ends of rafters in roofs of various pitches. Fractional numbers, as "$\frac{1}{6}$," "$\frac{1}{4}$," "$\frac{1}{3}$," &c., indicate the pitches of roofs in common use. When the line on the disk 21 is set opposite the number indicating the required pitch of roof, the correct angle is formed between the surface 24 and either edge of the blade 22. It is obvious that the sum of the angles at A and B is equal to ninety degrees, or a right angle, so that the proper angle for cutting the bottom end of the rafters is formed between the surface 25 and either edge of the blade, the setting of the instrument remaining the same for both ends of the rafters of any given pitch. In addition to the fractional graduations for obtaining the angles of different-pitch rafters I provide on one end of the straight-edge 22 a table of contents which when multiplied by half the width of the roof gives the length of the rafters for the various pitches in common use. As a further convenience in determining the length of rafters I provide on the opposite end of the blade 22 a table showing the lengths of rafters for the different pitches for the more common widths of buildings.

It is obvious from the above description that my combination-square, although exceedingly simple in structure, is capable of use in a number of ways. Of course it will be understood that I can vary the parts for securing the same ends without departing from the spirit of the invention.

Having now described my invention, what I claim as new, and desire to secure by Letters Patent, is—

1. A combination square and protractor, comprising a head having a flat base-surface, a vertical surface extending at right angles from said base-surface, a miter-face extending from said vertical face at an angle of forty-five degrees, a bar in prolongation of said miter-face, the side of said bar opposite said miter-face extending parallel to said miter-face and forming one side of a center-square, a face extending at right angles from said last-mentioned side to form the remaining member of said center-square, a circular opening within said head, a set-screw extending through said head and into said opening, a graduated annulus revolubly held within said opening, said annulus being partially slotted, aforesaid base-surface being slotted to provide a stop, aforesaid vertical face being slotted, aforesaid miter-face and bar being slotted, said last-mentioned member of said center-square being slotted to provide a stop, a straight-edge slidably held within aforesaid annulus and working within said slotted head so that said straight-edge is stopped in one position at right angles to aforesaid flat base surface and in its remaining stop position at right angles to said vertical surface, a threaded holder extending from said annulus to engage said straight-edge, and a thumb-nut engaging said threaded holder to adjustably secure aforesaid straight-edge to said annulus, as and for the purpose set forth.

2. A combination-square comprising a head having a flat base-surface, a vertical surface extending at right angles from said base-surface, a miter-face extending from said vertical face at an angle of forty-five degrees, a bar in prolongation of said miter-face, a side of said bar opposite said miter-face extending parallel to said miter-face and forming one side of a center-square, a face extending at right angles from said last-mentioned side to form the remaining member of said center-square, a circular opening within said head, an annulus finding a bearing within said recess, said annulus having a groove in its periphery, a shoe loosely resting in said groove, a set-screw carried by said head and bearing upon said shoe, whereby the disk may be held in its bearing and may be clamped at any point, and a straight-edge carried by the said annulus substantially as described.

3. A combination-square comprising a head having a flat base-surface, a vertical surface extending at right angles from said base-surface, a miter-face extending from said vertical face at an angle of forty-five degrees, a bar in prolongation of said miter-face, the side of said bar opposite said miter-face extending parallel to said miter-face and forming one side of a center-square, a face extending at right angles from said last-mentioned side to form the remaining member of said center-square, a circular opening within said head, an annulus having a flange on one side engaging a counter subbearing in said head, a straight-edge slidably carried by the said annulus, and means traveling in a groove on the periphery of said annulus or disk for holding the same in position in connection with the flange of said disk, said means also clamping the disk in its adjusted positions substantially as described.

4. A combination square and protractor comprising a head having a flat base-surface, a vertical surface extending at right angles from said base-surface, a miter-face extending from said vertical face at an angle of forty-five degrees, a bar in prolongation of said miter-face, the side of said bar opposite said miter-face extending parallel to said miter-face and forming one side of a center-square, a face extending at right angles from said last-mentioned side to form the remaining member of said center-square, a circular opening within said head, an annulus having a groove in its periphery, said annulus lying in the opening in said head, a lip or shoulder on said annulus engaging one face of said head to prevent lateral displacement of said annulus in one direction, means carried by said head engaging said peripheral groove for preventing lateral movement of said disk in an opposite direction, and a straight-edge carried by said annulus substantially as described.

5. A combination square and protractor, comprising a head having a flat base-surface and two flat sides, a vertical surface extending at right angles from said base-surface, a miter-face extending from said vertical face at an angle of forty-five degrees, a bar in prolongation of said miter-face, the side of said bar opposite said miter-face extending parallel to said miter-face and forming one side of a center-square, said head being provided with a face extending at right angles to said last-mentioned side to form the remaining member of said center-square, a circular opening within said head, an annulus having an annular groove, said annulus rotating within said circular opening, an annular shoulder engaging one face of said head, a set-screw passing through said head and into said annular groove and a straight-edge carried by said disk substantially as described.

In testimony whereof I affix my signature in presence of two witnesses.

EMANUEL OEHRLE.

Witnesses:

GEORGE W. SUES,

FREDERICK J. LARSON.